Figure 6:
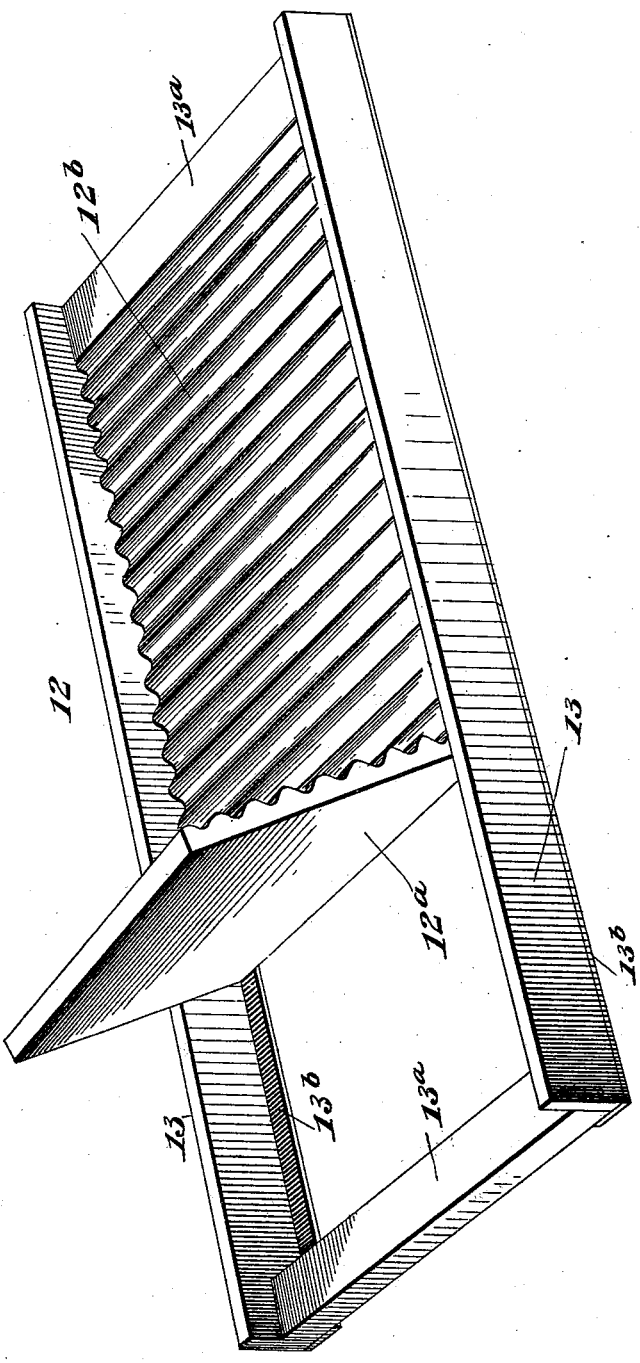

(No Model.) 3 Sheets—Sheet 1.
W. D. SPRAGUE.
KNEADING AND ROLLING MACHINE.
No. 562,258. Patented June 16, 1896.
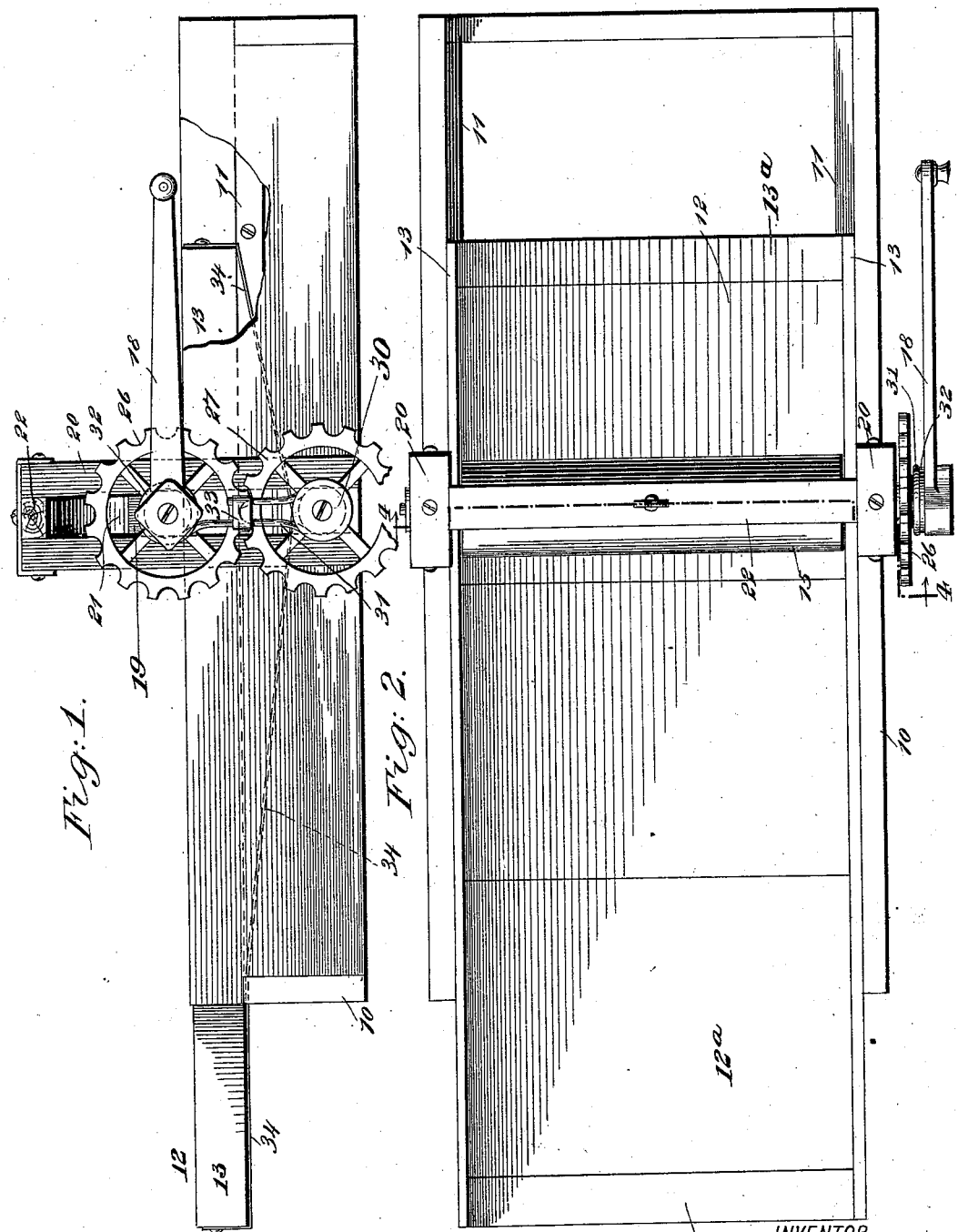
WITNESSES:
John A. Rennie
H. P. Hutchinson
INVENTOR
W. D. Sprague.
BY Munn & Co
ATTORNEYS.

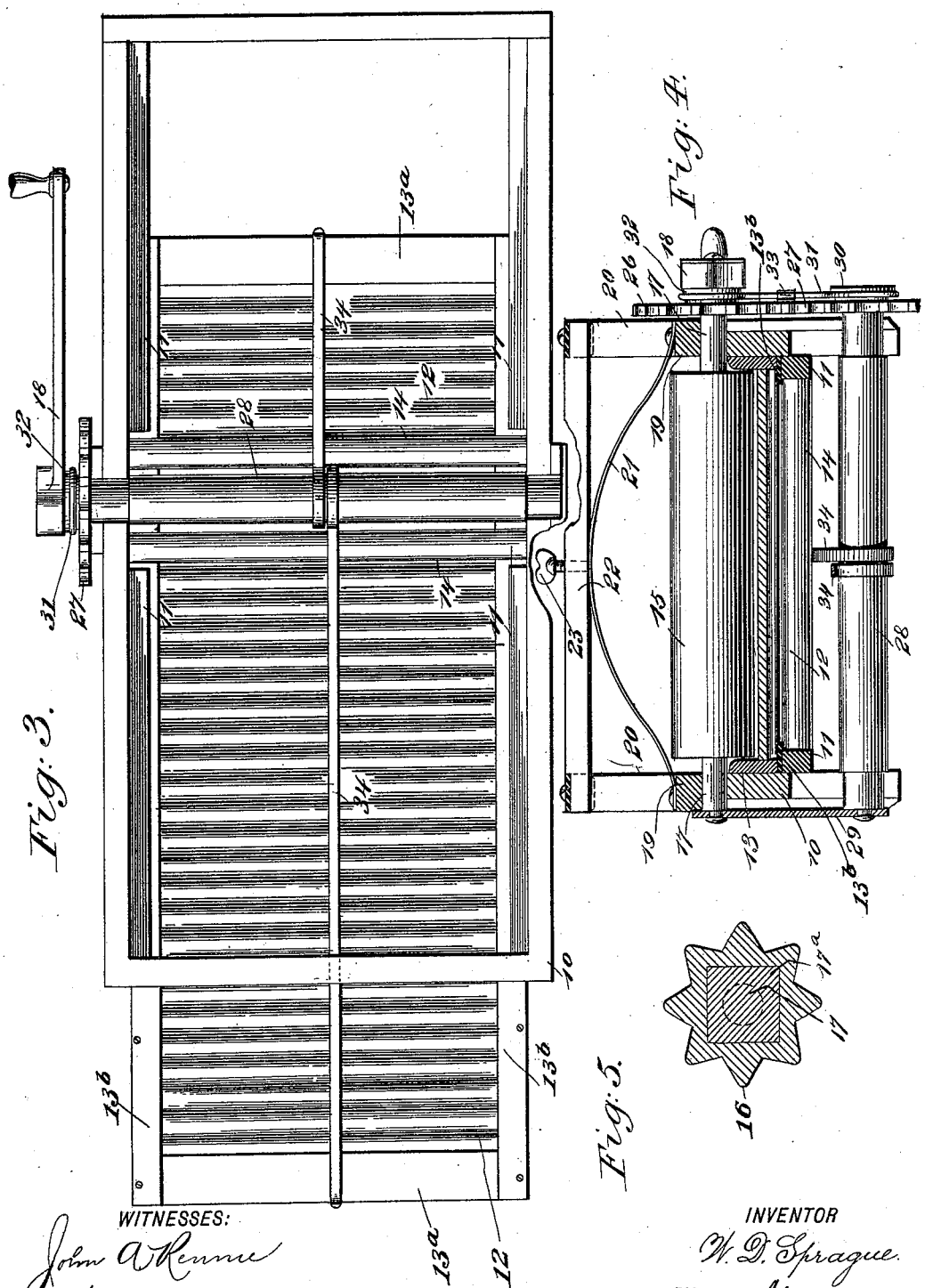

(No Model.) 3 Sheets—Sheet 3.
W. D. SPRAGUE.
KNEADING AND ROLLING MACHINE.

No. 562,258. Patented June 16, 1896.

WITNESSES:

INVENTOR
W. D. Sprague.
BY
ATTORNEYS.

UNITED STATES PATENT OFFICE.

WILLIAM DANN SPRAGUE, OF BLACK MOUNTAIN, NORTH CAROLINA.

KNEADING AND ROLLING MACHINE.

SPECIFICATION forming part of Letters Patent No. 562,258, dated June 16, 1896.

Application filed October 5, 1895. Serial No. 564,763. (No model.)

*To all whom it may concern:*

Be it known that I, WILLIAM DANN SPRAGUE, of Black Mountain, in the county of Buncombe and State of North Carolina, have invented certain new and useful Improvements in Kneading and Rolling Machines, of which the following is a full, clear, and exact description.

My invention relates to improvements in that class of machines which are adapted for use in working dough; and the object of my invention is to produce a machine of the greatest simplicity, which is adapted to rapidly and efficiently knead and then roll dough, avoiding the necessity of working the dough with the hands, and further, to construct a machine which is arranged so that it is not likely to get out of order and so that it may easily be kept clean.

Another object of my invention is to produce a machine which manipulates the dough in much the same manner as it is worked by hand, and which has its rollers adjustable so that they may bear upon the dough with the requisite pressure.

To these ends my invention consists of certain features of construction and combinations of parts, which will be hereinafter described and claimed.

Reference is to be had to the accompanying drawings, forming a part of this specification, in which similar characters of reference indicate corresponding parts in all the figures.

Figure 1 is a side elevation of the machine with a part broken away. Fig. 2 is a plan view of the machine. Fig. 3 is an inverted plan of the machine. Fig. 4 is a vertical cross-section on the line 4 4 of Fig. 2. Fig. 5 is a detail cross-section of the roller axle or shaft and the kneading-roller thereon, and Fig. 6 is a detached perspective view showing the construction of the rolling or kneading board.

The machine is provided with a suitable frame 10, which is preferably in the form of a rectangular box, as shown, and this frame is provided with internal longitudinal ribs 11 on which slides the rolling-board.

The rolling or kneading board 12 is constructed with a rectangular open frame, as shown in Fig. 6, said frame comprising side rails 13, united at their ends by cross pieces or bars $13^a$, and to the under side of said side rails 13 are secured longitudinal strips $13^b$, serving to hold in place the board proper, which is composed of a series of detachable sections $12^a$ flat on their upper sides and transversely fluted on their lower sides, as at $12^b$, so that when it is desired to knead the dough said sections may be conveniently removed and inverted, so as to present their fluted sides uppermost.

The under sides of the strips $13^b$ of the frame of the board 12 also run on antifriction-rollers 14, which are journaled transversely in the frame between the opposite end sections of the ribs 11, as shown clearly in Fig. 3. In connection with the rolling-board, rollers 15 and 16 are adapted to be used, the former being shown in Figs. 1 and 4, and being adapted to serve the purposes of an ordinary rolling-pin and the latter being adapted for use in kneading the dough; and to this end the roller 16 is fluted longitudinally, as the drawings clearly show.

The rollers 15 and 16 are adapted to be alternately used on the axle or shaft 17, which has a squared central section $17^a$ (see Fig. 5) to fit a corresponding bore in either of the rollers, and this shaft 17 is provided at one end with a crank 18 by which it and its roller may be turned. The shaft is journaled on the frame 10 and the bearing for the upper side of the shaft is formed of bearing-blocks 19, which are vertically movable in slideways 20 on opposite sides of the frame 10, the blocks being secured to a stiff flat curved spring 21, the central portion of which is secured to a cross-bar 22, and said spring is adjustable in the slideways 20, by means of a thumb-screw 23, arranged in the center of the cross-bar 22 and adapted when turned to cause the blocks 19 to move. This arrangement provides for adjusting the spring so as to regulate its tension and consequently regulate the pressure with which the rollers bear on the dough.

I do not limit myself to the precise form of spring mechanism for adjusting the tension of the rollers, and any suitable springs may be provided for the purpose.

The axle or shaft 17 has detachably secured to one end a gear-wheel 26, which meshes with a gear 27 on one end of the driving-shaft 28, which is journaled beneath the board 12 and parallel with the shaft 17. One end of the shaft 28 is journaled in a strap 29, which depends from one end of the shaft 17, and the other end of the shaft 28 is provided with a grooved collar 30, which receives a spring-link 31, connecting the collar with a similar one 32 on the hub of the gear-wheel 26, the spring-link being held in place by a clip 33, which fastens the longer free end of the link to the body portion thereof, as best shown in Fig. 1.

The shaft 28 has a strap 34 wound around it, and the ends of the strap diverge and are fastened to the opposite end bars 13ᵃ of the rolling-board frame, so that when the shaft is revolved, first in one direction and then in another, the strap will be wound back and forth thereon and will impart a reciprocating movement to the rolling-board.

When the machine is to be used for kneading and rolling, the fluted roller 16 (shown in Fig. 5) is first slipped upon the shaft 17, being held on the squared portion 17ᵃ thereof, and the shaft is applied to the machine-frame and connected with the shaft 28, as described, and with its crank 18. The sections 12ᵃ of the rolling or kneading board are then removed from the frame and inverted, so as to cause their fluted under sides to come uppermost, after which the spring 21 is adjusted by means of its screw 23 so as to cause the roller 16 to press closely against the grooved upper side of the kneading-board. The dough is then placed on said board, and then the crank 18 is turned backward and forward, causing the fluted roller 16 to be revolved and the board 12 to be reciprocated beneath it, thus bringing all parts of the dough into contact with the roller and causing the dough to be thoroughly kneaded. The kneading being accomplished, the rolling-pin 15 is substituted for the roller 16 and the sections 12ᵃ of the board are again inverted and the work proceeded with as before, but in this case the roller 15 acts as an ordinary rolling-pin and rolls the dough into a thin sheet.

If desired, a separate shaft 17 and accessory attachments may be used for the rollers 15 and 16, thus facilitating the quick changing of the machine from a kneading-machine to a rolling-machine, but this is not essential.

Having thus described my invention, I claim as new and desire to secure by Letters Patent—

1. In a dough-kneader, the combination of a box having guides, a rolling-board consisting of a rectangular open frame having strips secured to and extending longitudinally along its opposite sides and adapted to engage the guides of the box, said strips extending inward beyond the inner sides of the open frame, reversible sections held in said open frame and supported on said strips, a roller journaled on the box in position to roll the dough held on one side of said board, means for actuating said roller, and means for imparting longitudinal movement to said board, substantially as set forth.

2. In a dough-kneader, the combination of a frame having guides, a rolling-board mounted to reciprocate on said guides, a roller journaled on the frame above said board, a driving-shaft, means for actuating the rolling-board from said shaft, gears on the roller and on said shaft arranged to mesh with each other, said shaft being journaled at one end in a strap depending from one side of the frame, the said strap, a spring-link connecting the opposite end of the driving-shaft with the frame, and a clip for holding the ends of said spring-link, substantially as set forth.

3. In a dough-kneader, the combination of a frame having guides, a rolling-board mounted to reciprocate on said guides, a roller journaled on the frame above said board, a driving-shaft, means for actuating the rolling-board from said shaft, gears on the roller and on said shaft arranged to mesh with each other, said shaft being journaled at one end in a strap depending from one side of the frame, the said strap, grooved collars on the ends of the driving-shaft and of the roller, a spring-link having its opposite ends bent to engage said collars, and a clip arranged to hold the free end of said spring-link, substantially as set forth.

WILLIAM DANN SPRAGUE.

Witnesses:
D. T. CARRAWAY,
P. V. WOLF.